United States Patent
Peel et al.

(10) Patent No.: US 9,435,004 B2
(45) Date of Patent: Sep. 6, 2016

(54) WASTE HANDLING METHODS AND APPARATUS

(75) Inventors: Alan Peel, Derbyshire (GB); Andrew Gibbs, Derbyshire (GB)

(73) Assignee: Altek Europe Limited, Derbyshire (GB)

( * ) Notice: Subject to any disclaimer, the term of this patent is extended or adjusted under 35 U.S.C. 154(b) by 177 days.

(21) Appl. No.: 13/806,015

(22) PCT Filed: Jun. 21, 2011

(86) PCT No.: PCT/GB2011/051155
§ 371 (c)(1),
(2), (4) Date: Feb. 25, 2013

(87) PCT Pub. No.: WO2011/161443
PCT Pub. Date: Dec. 29, 2011

(65) Prior Publication Data
US 2013/0139650 A1 Jun. 6, 2013

(30) Foreign Application Priority Data

Jun. 21, 2010 (GB) .................................. 1010351.3
Jun. 21, 2011 (WO) ................ PCT/GB2011/051155

(51) Int. Cl.
C22B 7/02 (2006.01)
C22B 7/04 (2006.01)
C22B 21/00 (2006.01)
C22B 1/00 (2006.01)

(52) U.S. Cl.
CPC . *C22B 1/00* (2013.01); *C22B 7/04* (2013.01); *C22B 21/0069* (2013.01); *Y02P 10/212* (2015.11)

(58) Field of Classification Search
CPC ........ C22B 7/02; C22B 7/04; C22B 21/0069
USPC ..................... 75/770, 672; 266/44
See application file for complete search history.

(56) References Cited

U.S. PATENT DOCUMENTS

| | | | |
|---|---|---|---|
| 4,386,956 A * | 6/1983 | Roth et al. ...................... | 75/412 |
| 4,540,163 A | 9/1985 | van Linden et al. | |
| 5,397,104 A | 3/1995 | Roth | |
| 6,063,330 A | 5/2000 | Bramley | |
| 6,228,319 B1 | 5/2001 | Roth et al. | |
| 2011/0083532 A1* | 4/2011 | Roth .............................. | 75/414 |

FOREIGN PATENT DOCUMENTS

EP 0 224 343 A1 6/1987

OTHER PUBLICATIONS

Ruff, Wolfram. German Patent DE 19605532 A1 published Aug. 21, 1997. Machine translation.*
"CRCnetBASE—Aluminum Recycling." CRCnetBASE—Aluminum Recycling. Taylor & Francis Group, LLC, 2007. Web. Apr. 28, 2016. Chapter 13 "Dross Processing," pp. 193-208.*
Manfredi, O. et al., "Characterizing the Physical and Chemical Properties of Aluminum Dross," JOM, Nov. 1997, pp. 48-49.

* cited by examiner

*Primary Examiner* — George Wyszomierski
*Assistant Examiner* — Tima M McGuthry Banks
(74) *Attorney, Agent, or Firm* — Craig Metcalf; Kirton McConkie (57) ABSTRACT

Apparatus and a method of handling a molten metal processing by-product are provided in which the by-product is placed in a container unit and put in the apparatus, the apparatus including an element having a first position outside of the container and a second position in which at least a part of the element is in the container so as to compress the by-product and exclude oxygen from it. The element also serves to transfer heat from the contents of the container unit to the element and so provide cooling. The element can then be returned to the first position, the container unit be removed and placed at a cooling location for final cooling.

21 Claims, 4 Drawing Sheets

WASTE HANDLING METHODS AND APPARATUS

This application is a National Stage of International Application No. PCT/GB2011/051155, filed Jun. 21, 2011, and entitled IMPROVEMENTS IN AND RELATING TO WASTE HANDLING METHODS AND APPARATUS, which claims the benefit of GB 1010351.3, filed Jun. 21, 2010. This application claims priority to and incorporates herein by reference the above-referenced applications in their entirety.

The present invention concerns improvements in and relating to methods and apparatus for handling products and/or by-products from molten metal processing and in particular wastes arising therefrom.

In many molten metal processing operations by-products on the surface of the molten metal arise. These are commonly referred to as slags or drosses or salt cake. They are normally separated from the molten metal in one or more operations. They frequently incorporate metal within them and hence it is useful to recover that metal if possible.

Particularly in the context of aluminium processing, whilst some attempts have been made to recover the metal, the recovery is not complete. The end waste product is generally a hot waste which is dumped and left to cool on its own.

The present invention seeks, amongst its potential benefits, to provide for improved handling of the waste product. The present invention seeks, amongst its potential benefits, to recover more metal from the waste products.

According to a first aspect the invention provides a method of handling a molten metal processing by-product, the method including:
  providing a container unit;
  providing the by-product in the container unit;
  providing apparatus, the apparatus including an element having a first position outside of the container and a second position in which at least a part of the element is in the container;
  providing the container unit in the apparatus;
  moving the element from the first position to the second position;
  transferring heat from the contents of the container unit to the element;
  compressing at least a part of the contents of the container unit;
  moving the element from the second position towards the first position;
  removing the container unit from the apparatus; and
  positioning the container unit at a cooling location.

The molten metal may particularly be aluminium.

The molten metal may be formed in a primary smelting operation. The molten melt may be formed form an ore and/or refined ore, for instance alumina.

The molten metal may be formed in a refining and/or alloying operation, particularly one to which the feed is aluminium.

The molten metal may be formed in a secondary smelting operation. The molten metal may be formed from a recycled form of the metal and/or a by-product of a previous smelting operation.

The by-product may particularly be a waste product. The by-product may be a black dross. The by-product may be a slat cake. The by-product may be a baghouse dust. The by-product may be a slag. The by-product may be a mixture of multiple by-products.

The by-product may have a metal content, particularly an aluminium content, of less than 25% by weight, more preferably less than 20% and potentially less than 18%. The by-product may have a metal content, particularly an aluminium content, of between 1 to 25% by weight, more preferably between 8% and 20% and ideally between 12 and 18%, by weight. The by-product may have a salt content, particularly a chloride and fluoride salt content, of 10 to 75% by weight, more preferably between 12 and 50% and ideally between 15 and 45%. A unit volume of the by-product on being provided in the container unit may be compactable to less than 75% of the original unit volume within the container unit, potentially less than 65% and even to less than 50%. The by-product may be a black dross.

The by-product may have a metal content, particularly an aluminium content, of less than 25% by weight, more preferably less than 22.5% and potentially less than 20%. The by-product may have a metal content, particularly an aluminium content, of between 0.5 to 25% by weight, more preferably between 1% and 20% and ideally between 2 and 15%, by weight. The by-product may have a salt content, particularly a chloride and fluoride salt content, of 10 to 85% by weight, more preferably between 15 and 80% and ideally between 20 and 75%. A unit volume of the by-product on being provided in the container unit may be compactable to less than 85% of the original unit volume within the container unit, potentially less than 75% and even to less than 65%. The by-product may be a salt cake.

The by-product may have a metal content, particularly an aluminium content, of less than 25% by weight, more preferably less than 20% and potentially less than 18%. The by-product may have a metal content, particularly an aluminium content, of between 1 to 25% by weight, more preferably between 2% and 20% and ideally between 5 and 15%, by weight. The by-product may have a salt content, particularly a chloride and fluoride salt content, of 2 to 25% by weight, more preferably between 5 and 20% and ideally between 8 and 15%. A unit volume of the by-product on being provided in the container unit may be compactable to less than 90% of the original unit volume within the container unit, potentially less than 80% and even to less than 70%. The by-product may be a baghouse dust.

The container unit may be provided with a support structure for the container unit. The support structure may include one or more elements for supporting the container unit against deformation and/or during the transition from first state to second state. The support structure may maintain the profile of the container unit, for instance during the application of a force into the container and/or the compression of by-products within the container.

The support structure may include one or more elements for supporting the container unit in an orientation. The support structure may maintain the container in an orientation relative to a surface and/or on a level. The support structure may provide one or more support surfaces in a common plane, that plane being lower than other parts of the support structure.

The support structure may include one or more elements for supporting the container unit during transport and/or lifting. The support structure may include one or more elements which provide lifting locations, for instance by releaseably engage with a lifting device. The one or more lifting locations may include a planar surface. The planar surface may be an internal surface of a hollow component, such as a tube or sleeve.

The container unit may be dished. The container unit may have the greatest depth at its centre. The container unit may have a circular profile in plan view. The container unit may have its greatest depth along a centre line. The container unit may have an oval profile in plan view. The oval may have curved or straight sides.

The inside surface of the container unit may be smooth. The inside surface of the container unit may be provided with one or more protrusions and/or recesses. One or more of the protrusions may be in the form of a rib.

A contact surface may be provided on the container unit. The contact surface may extend around the entire perimeter of the receiving location for the by-product. The contact surface may be provided at the edge of the container unit and/or may be provided at the edge of the receiving location and/or may be provided intermediate the edge of the container unit and edge of the receiving location. The contact surface may be a planar surface. The contact surface may be horizontal +/−10°. The contact surface may be inclined, for instance with a part which is nearer the receiving location being lower than a part which is further from the receiving location. The contact surface may by annular in plan view. The contact surface may be oval in plan view, for instance with straight sides or curved sides.

The method may include engaging a lifting device with the container unit and particularly the support structure thereof and ideally the lifting locations. The lifting device may be a forklift truck. The method may include moving the container unit to a loading location. The loading location may be at an outlet from a previous process unit, such as a smelter or furnace, and for instance a rotary furnace. The method may include the container unit receiving the by-product direct from the previous process unit, such as a rotary furnace, or from an interim storage location.

The apparatus may include one or more actuators for applying the force to move the element from the first position to the second position. The apparatus may include one or more side walls, upper walls, front walls or doors, for instance to form a process enclosure.

The element may be include one or more by-product contacting surfaces. The element may be provided with a lower surface and an upper surface. The lower surface may have one or more downward extending protrusions or surfaces, the by-product contacting surfaces. The lower surface may, relative to a horizontal plane, have a downward extent which varies with position in the horizontal plane. The variation in downward extent may be such as to give a wedge shaped lower surface. The variation may be such as to give a pyramidal or conical shaped lower surface. One or more of the by-product contacting surfaces may be planar surfaces and/or smooth surfaces. The lower surface may be in the form of a wedge whose apex angle is between 30° and 120°, preferably between 45° and 100°, and more preferably between 60° and 90°. The end walls of the wedge may be inclined to the vertical or may be vertical.

The container unit may include a receiving location for the by-product.

The element may have a lower surface which is complimentary, in part or wholly, to the opposing part of the receiving location. The outside surface of the lower surface of the element, and particularly that opposing the receiving location may be smooth.

One or more parts, particularly the lower surface, of the element may contact the by-products in use. In particular, they may compress the by-products in use, for instance between the one or more parts and the inside surface of the container.

The element may be provided with an abutment surface. The abutment surface may be adapted to receive and/or cooperate with a component, for instance a component such as a ram and/or moved by an actuator. The abutment surface may be provided on the upper surface of the element.

A second contact surface may be provided on the element. The second contact surface may extend around the entire perimeter of the element. The second contact surface may be provided at the edge of the element, particularly on the lower surface thereof and/or may be provided at the edge of the element and/or may be provided intermediate the edge of the closure element. The second contact surface may be a planar surface. The second contact surface may be horizontal +/−10°. The second contact surface may be inclined, for instance with a part which is closer to the receiving location lower than a part which is further from the receiving location. The second contact surface may by annular in plan view. The second contact surface may be oval in plan view, for instance with straight sides or curved sides.

The method may include moving the container unit from the loading location to the apparatus, for instance using a lifting device and preferably using the same type of lifting device. The method may include placing the container unit in the apparatus. The container unit may be placed on the floor of the apparatus. The lifting device may be separated from the container unit.

The method may include closing one or more doors provided on the process unit once the apparatus is provided therein.

The method may include moving one or more actuators. The actuator(s) may be moved into contact with the closure element(s), and in particular an abutment surface provided thereon.

The method may include pushing the element into the by-product and/or receiving location. The method may include reducing the separation of the element and the receiving location.

The method may include the transition from the first position towards the second position forcing oxygen out of the by-product and/or receiving location. The method may include the transition from the first position towards the second position reducing the permeability of one or more parts of the by-product. The method may include the transition from the first position towards the second position reducing the temperature of one or more parts of the by-product. The method may include the transition from the first position towards the second position reducing the volume occupied by the by-product.

The method may include the transition from the first to the second position causing the metal content, particularly the aluminium content, of the by-product in the container unit to reduce by less than 10% by weight, more preferably by less than 5% by weight and potentially by less than 2%. The method may include the transition from the first to the second position through to the transition from the second position towards the first position causing the metal content, particularly the aluminium content, of the by-product in the container unit to reduce by less than 10% by weight, more preferably by less than 5% by weight and potentially by less than 2%.

The method may include the transition from the first to the second position causing the metal content of the by-product, present as elemental aluminium to be at least 80% of that at the start of the transition, more preferably at least 85% and ideally at least 90%. The method may include the transition from the first to the second position through to the transition from the second position towards the first position causing the metal content of the by-product, present as elemental aluminium to be at least 80% of that at the start of the transition, more preferably at least 85% and ideally at least 90%.

The method may include the transition from the first to the second position causing the permeability of the by-product to be reduced. The reduction in permeability may be to a level less than 85% of the permeability of the by-product at the start of the transition, preferably to a level less than 75%, more preferably to a level less than 65% and ideally less than 50%. The reduction in permeability may be considered with respect to the values for a 5 cm×5 cm×5 cm cube volume of the by-product at the top of the by-product, positioned at the mid-point of a centre-line on the longitudinal axis of the container unit and/or at the centre of the container unit, when considered before the transition starts and at a point in time after the transition towards the first position.

The method may include the transition from the first to the second position causing a differential change in permeability between one part of the by-product and another part. The differential change may be provided by the permeability of the by-product at both first and second positions being reduced, but by different amounts. Preferably the permeability of a first position proximal the upper surface of the by-product is lower than the permeability of a second position distal the upper surface of the by-product, after the transition from first to second positions. The proximal portion may be a part within the upper 10% of the depth of by-product. The distal position may be in the lower 30% of the depth of the by-product.

One or more parts of the by-product may have their permeability reduced to a level less than 50% of the permeability of the by-product at those part(s) at the start of the transition, preferably to a level less than 40%, more preferably to a level less than 30% and ideally less than 20%. The reduction in permeability may be considered with respect to the values for a 5 cm×5 cm×5 cm cube volume of the by-product at the part.

The method may include the transition from the first to the second position and/or transferring heat from the contents of the container unit causing a permeability change in the surface layer of the by-product and/or the by-product adjacent the element and particularly the cooling surface(s) thereof. The permeability change may be a differential change and preferably a greater change that at one or more other locations within the by-product. The method may include the transition from the first to the second position and/or transferring heat from the contents of the container unit causing a oxygen impermeable and/or oxygen flow inhibiting layer to form on the by-product. The method may include the transition from the first to the second position and/or transferring heat from the contents of the container unit causing a skin of relatively impermeable by-product to form.

The method may include pushing the element towards the container unit until the contact surface and second contact surface are in contact with one another.

The contact surface and second contact surfaces may have complementary profiles. The contact surface and the second contact surface may have corresponding shapes and/or configurations and/or dimensions.

The method may include holding the element in the second position for a period of time under load from the actuators. After a period of time, preferably pre-determined, the load from the actuators may be reduced and/or removed.

The contact surface and second contact surface may provide a restriction to the flow of gas from the environments of the container unit into the receiving location. The contact surface and second contact surface may seal the receiving location against the flow of gas from the environments of the container unit into the receiving location. The gas may be air. The gas may include oxygen.

The contact surface and second contact surface may directly abut one another. The contact surface and second contact surface may indirectly abut one another, for instance one or more components may be provided in the contact surface and/or the second contact surface and those may abut one another and/or the opposing contact surface. One or more agents may be provided between the contact surface and the second contact surface and/or in proximity thereto. The one or more agents may be metal from within the receiving location.

In the first position, the receiving location may be accessible for the introduction of the by-product to the receiving location. The by-product may be introduced from above.

In the second position, the contact may provide a restriction to the flow of gas from the environments of the apparatus into the receiving location and/or may seal the receiving location against the flow of gas from the environments of the apparatus into the receiving location.

The method may include opening one or more doors provided on the apparatus. The method may include a lifting device engaging with the container unit and particularly the support structure thereof and ideally the lifting locations. The lifting device may be of the same type as used in other steps of the method. The method may include moving the container unit from the apparatus to a storage location. The receiving location and/or container is preferably open during the movement to the storage location. The method may include detaching the lifting device from the container unit at the storage location.

The method may include allowing the container unit and by-product to cool. The method may include actively cooling the container unit and/or by-product. The cooling may be provided in the apparatus and/or in the storage location and/or during movement between the two.

The container unit may be provided with one or more heat exchange parts. The heat exchange parts may be elements connected to the container unit and/or surfaces provided on the container unit and/or surfaces on elements connected to the container unit. The heat exchange parts may be external to the container unit. The heat exchange parts may be provided internally within the container unit, for instance as one or more passages therein.

The element may be provided with one or more heat exchange parts. The heat exchange parts may be parts connected to the element and/or surfaces provided on the element and/or surfaces on parts connected to the element. The heat exchange parts may be external to the element. The heat exchange parts may be provided internally within the element, for instance as one or more passages therein. The element may be actively cooled, for instance by the passage of air into the element and out of the element. One or more blowers may be provided to generate air flow through the element.

The method may include draining molten metal from the bottom of the container unit during and/or after the transition from first state to second state.

The inside of the container unit may be provided with one or more through apertures. The one or more through apertures may lead to a channel or chamber. The channel or chamber may be provided in the support structure and/or below the container.

The method may include stacking one or more container units on top of another apparatus at a storage location. The method may include providing one or more container units inside an enclosure at the storage location. The enclosure may be passively cooled. The enclosure may be actively cooled, for instance through air flow provided therein. The method may include the provision of a plurality of apparatus at the storage location at one time.

The method may include removing the cooled by-product from the receiving location and/or container unit. The method may include disposing of or recycling the cooled by-product. The cooled by-product may be fed to a furnace.

The container unit may be cleaned after the by-product is removed. The contact surface of the container unit may be cleaned. The element may be cleaned after removal from the by-product. The second contact surface of the element may be cleaned.

The method may include introducing a further container unit to the process unit once the container unit is removed therefrom. The further container unit may be introduced whilst the container unit is being moved to the storage location. The further container unit may be introduced to the apparatus after the container unit has been moved to the storage location.

The method may include repeating one or more of the steps provided on the further container unit and one or more yet further container units.

According to a second aspect the invention provides a metal processing system, wherein the system includes:
a container unit for a by-product of the metal processing system;
an apparatus, the apparatus having:
a support surface for the container;
an element, the element having a first position outside of the container unit and a second position in which at least a part of the element is in the container unit;
an actuator for moving the element;
and one or more of:
a furnace;
a metal from by-product separator;
a second furnace, such as a rotary furnace;
a second metal from by-product separator;
a storage system.

According to a third aspect the invention provides apparatus for handling a by-product from a metal processing system, wherein the apparatus includes:
a support surface for a container;
an element, the element having a first position outside of the container unit and a second position in which at least a part of the element is in the container unit;
an actuator for moving the element.

The first and/or second and/or third aspects of the invention may include any of the features, options or possibilities set out herein, including in the description and/or other aspects.

Various embodiments of the invention will now be described, by way of example only, and with reference to the accompanying drawings in which.

Figure 1:
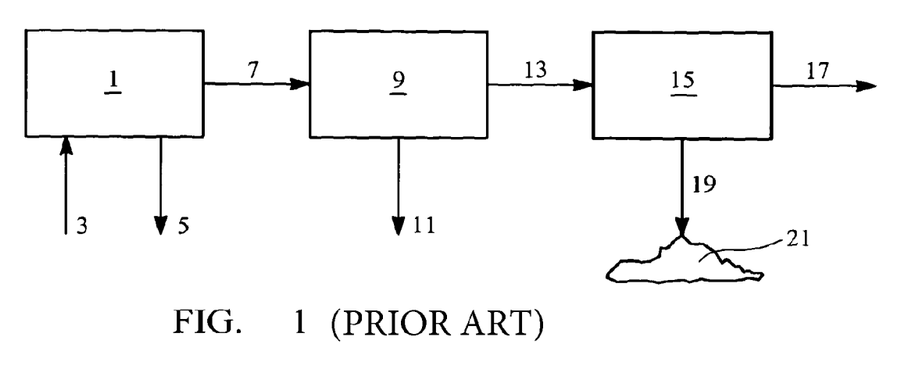
FIG. 1 illustrates a typical primary aluminium processing system.

FIG. 1 illustrates a metal smelting and recovery process. A furnace 1 is provided with a feed material 3 which contains aluminium. During the smelting operation provided by the furnace 1, a molten aluminium stream 5 is generated. Such a smelting operation may be a primary smelting operation, where aluminium is produced from alumina and/or where alumina is refining and/or where aluminium is alloyed. During such a primary smelting operation, the molten aluminium separates from impurities in the feed material 3 to give the molten aluminium stream 5 and a dross stream 7. The dross stream 7 is formed by the material which accumulates on the surface on the melt.

As well as waste components, the dross stream 7 also includes significant aluminium content. Such drosses may contain from 25 to 70% metallic aluminium by weight. They are typically referred to as white drosses. Where the aluminium content is high, such drosses are often lumpy in format and may have obvious metallic lumps within them. With lower metal contents, the white dross becomes more powdery in nature and less obvious as to its metallic content.

Because there is significant aluminium content in the dross, when the aluminium stream 5 and dross stream 7 are separated by the furnace 1, the dross stream 7 is often fed to a dross press 9.

The dross press 9 provides a container for the dross stream 7 and a press head which is forced into the dross. Such an arrangement is shown in GB2314090. The mechanical force applied to the dross forces the still molten aluminium from the dross and out of the container unit and hence recovers that aluminium as further aluminium stream 11.

The dross press 9 also produces a further dross stream 13 which still contains useful aluminium. That further dross stream 13 is fed to a rotary furnace 15. The heat in the furnace 15 causes aluminium to drain from the dross so as to generate a still further aluminium stream 17 and a waste stream 19.

The waste stream 19 is generally placed in an open pile 21 at a location within the process plant as a waste product. The waste stream 19 is extremely hot and continues to generate heat as a result of the thermite or aluminothermic reactions occurring therein. Substantial amounts of heat and fumes are given off whilst the reaction is completed and the waste cools. The waste is then disposed of as landfill.

The waste arising from smelting in this way is often referred to as a salt cake streams. The aluminium content of salt cake streams may be between 3 and 5% residual aluminium by weight.

At present, almost all salt cake is discarded, frequently to landfill sites.

A similar situation arises where secondary smelting operations are involved. Secondary smelting operations are concerned with aluminium recovered from melting aluminium scrap, recycled aluminium or dross from other aluminium smelting operations. Other waste streams, such as baghouse dusts, also contain aluminum which is presently discarded as waste; generally 1 to 20% metal by weight. These too can be processed in secondary smelting operations.

As well as a molten aluminium stream, such secondary smelting operations also generate a waste stream. This is frequently referred to a black dross. The aluminium content of black dross typically ranges between 12 to 18%. However, these black drosses have a higher salt content, typically higher than 40%, compared with white drosses.

At present, almost all black dross produced is also discarded. It is estimated that more than a million tonnes of black dross are generated each year throughout the world and that around 95% of this material is land filled.

Depending upon the additives added to further smelting operations, the end waste stream may be a salt cake or black dross. For instance, the rotary furnace of FIG. 1 may form a black dross where just melting or low salt additives are used. For instance, in secondary smelting operations which use dross as a fed, a high salt additive approach will generate a salt cake waste.

The salt content of white dross typically ranges between 8 to 15%, with similar values in baghouse dust, values typically ranging between 15 to 45% for black dross and 20% to 75% for salt cake. The salts are mainly sodium and potassium chloride, but with other compounds, including fluorides also present.

As a consequence, the applicant has designed an improved system which seeks to handle the waste streams which are presently discarded more effectively. This is so, whether it be a black dross, baghouse dust or salt cake stream. The improved system provides for rapid cooling of the waste stream and, self-sealing of the waste stream against ongoing oxidation.

The improved system offers a number of advantages and benefits. Firstly, the compression of the waste stream provides effective thermal contact between waste stream 19 and cooling elements. This quickly reduces the heat level within the waste stream 19. Additionally, the generation of the thermal contact causes compression of the waste stream 19 and this has beneficial effects on the permeability of the waste stream 19, particularly through formation of a skin thereon. The skin, described in more detail below, is beneficial in excluding air from the waste stream 19, and so the thermite reactions are ended earlier. This results in less fumes and off gassing to handle and quicker reduction of the waste steam to a temperature whereby it can go on to the next step. The early elimination of the thermite reactions also mean than there are meaningful amounts of aluminium within the cooled waste stream 19 which can be recovered. Previously, the thermite reactions proceeding to completion meant this aluminium was converted to useless oxide forms and hence wasted. The handling of the waste stream 19 according to the invention also provides better plant management and reduced safety/environmental issues.

Cooling times of 4-6 hours are achievable, compared with 24 hours plus with other methods.

Figure 2:
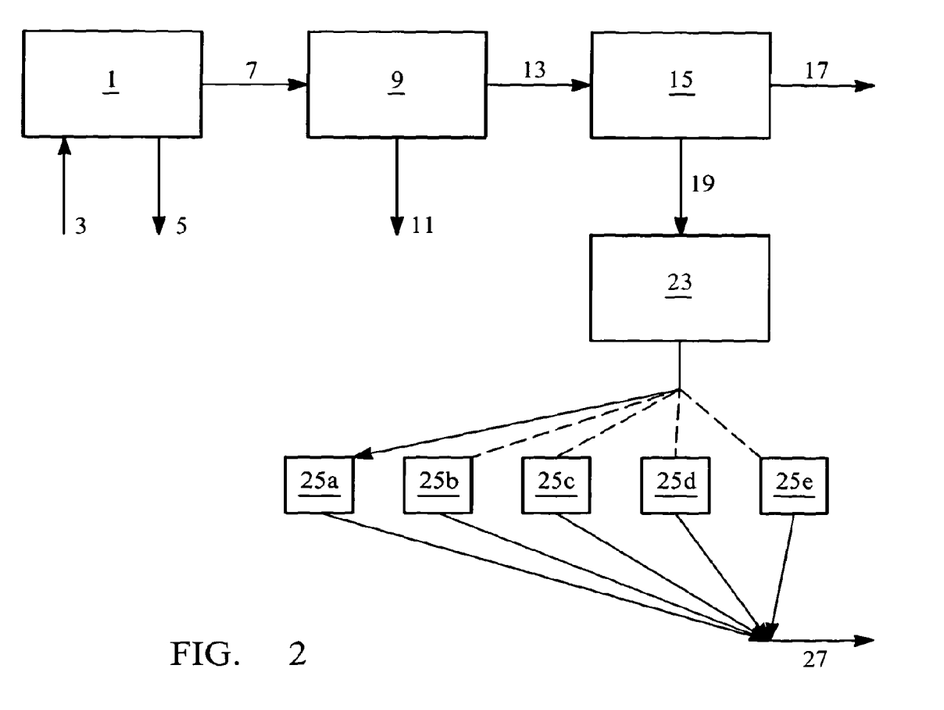
FIG. 2 illustrates a revised primary aluminium processing system incorporating the present invention.

In the revised process, illustrated in FIG. 2, the primary smelting process is as described above in relation to FIG. 1 through to the generation of the still further aluminium stream 17 and waste stream 19 from the rotary furnace 15. Instead of just dumping the waste stream 19, however, that waste is placed in a container unit and then placed in a press 23. After pressing in that press 23 for a suitable time, the container unit is removed and sent to one storage location 25*a* out of the many storage locations 25*a, b, c, d, e* that are provided. After further cooling, the contents of the containers form a recycle stream 27 which can be further processed, for instance to recover aluminium therein using a smelting stage. The recycle stream 27 could be fed to the rotary furnace 5 and/or furnace 1.

Figure 3:
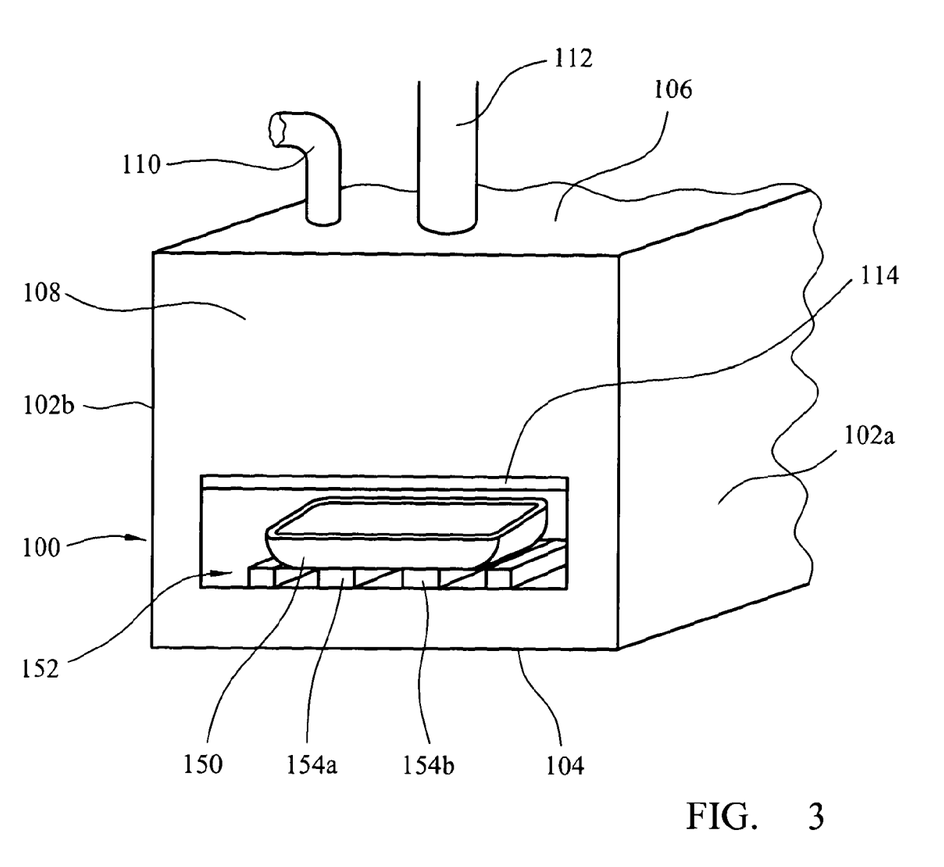
FIG. 3 illustrates an embodiment of apparatus used in the present invention.

The apparatus used in the invention is illustrated in more detail in FIGS. 3. The press 100 of FIG. 3 includes a side wall 102*a*, further side wall 102*b*, base 104 and roof 106. The rear wall and front wall 108 complete the structure.

In the roof 106 is an outlet 110 for air passing through the inside of the press 100. The outlet 110 leads to dust and/or off-gas treatment units, not shown. The dust treatment unit may provide a source of baghouse dust which can be recycled to recover aluminium therefrom. Also in the roof 106 is an opening through which the actuator 112 acts upon the press head provided within the press 100.

The front wall 108 includes a door 114. The door 114 slides up and down within the front wall 108 and as shown in FIG. 3 is in the raised position.

Within the press 100 a container unit 150 is shown. The container unit 150 is provided on a support structure 152. The container unit 150 is deepest in the middle and along its long axis and shallower at its periphery.

The support structure 152 includes a pair of recesses 154*a* and 154*b* which are configured to receive the lifting fork of a fork lift truck, not shown. Other forms of lifting vehicle and/or apparatus could be used, such as cranes. In operation, the container unit 150 is brought to a loading location to receive a pile of waste from the waste stream 19. The container unit 150 is then carried to and inserted into the press 100 so that the container unit 150 is positioned below the press head 200 shown in FIG. 4.

Figure 4:
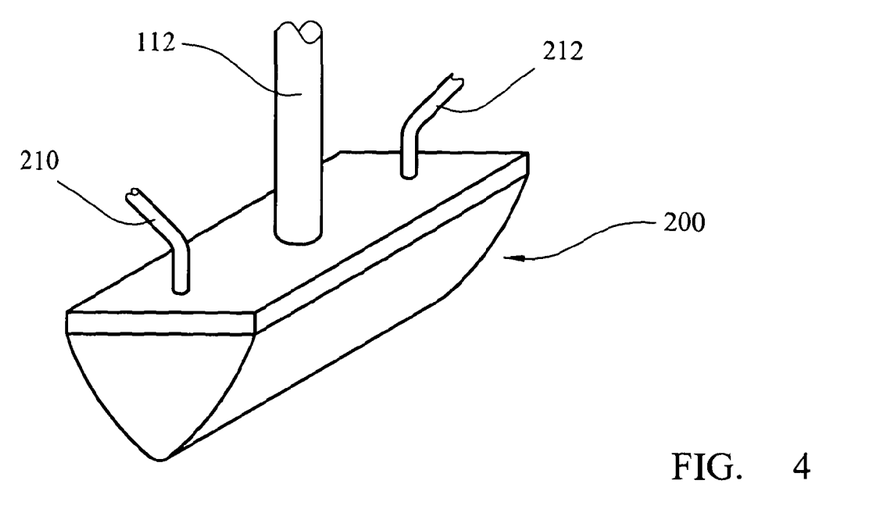
FIG. 4 illustrates an embodiment of a press head for use in the present invention.

The press head 200 is brought down into contact with the waste 202 in the container unit 150. Whilst in this position, the press head 200 is acting to compress the waste 202. The active cooling of the press head 200, by the passage of air there through, also serves to remove heat from the waste 202 at a high rate. An air inlet 210 and outlet 212 are provided, together with an air blower, not shown. After a limited period of pressing, the press head 200 is removed from the slag 202 and container unit 150. The wedge or chisel shaped profile of the press head 200 is design to give high surface contact with the waste 202. The surfaces of the press head 200 are smooth to assist detachment from the waste 202 after cooling and pressing. The surfaces of the press head 200 may be provided with treatments or coatings, for instance a boron nitride coat, to stop or reduce sticking to the press head 200.

The container unit 150 can then be removed from the dross press 100 and taken to a storage location 25*a, b, c*, etc.

Figure 5:
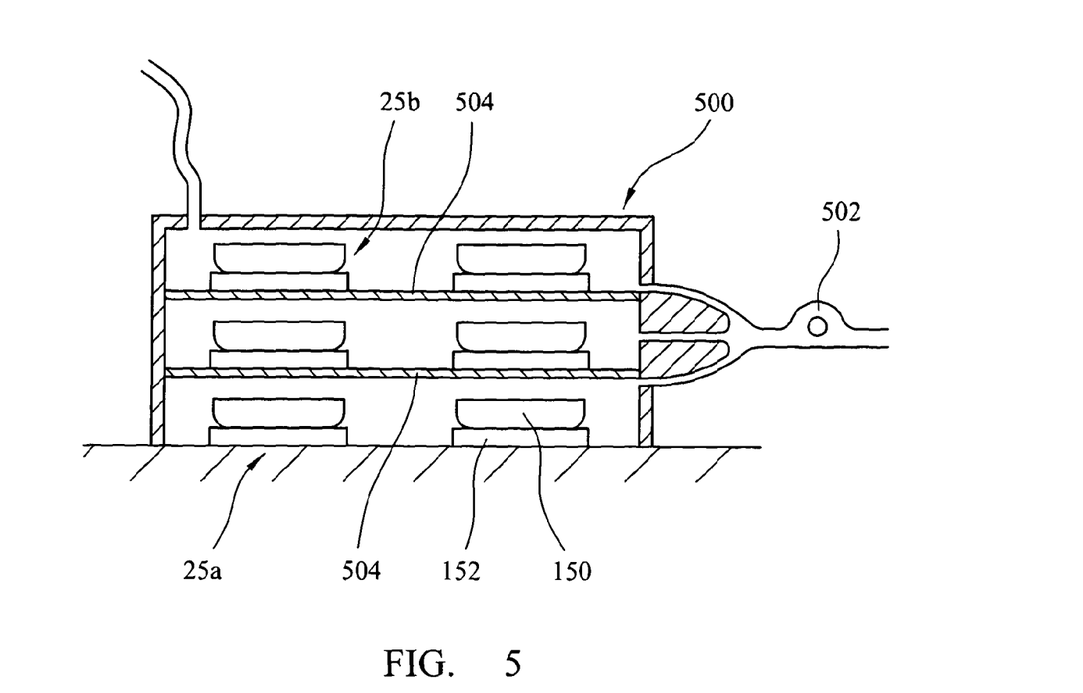
FIG. 5 illustrates a storage array which may be used in the present invention.

In one embodiment, the stacked arrangement of FIG. 5 is employed. In this case, a series of stacked container units 150 are provided within an enclosure 500. The storage locations 25*a, b* and *c* may be provided as one of the positions within such an enclosure 500. Multiple such enclosures 500 may be provided to increase the number of storage locations 25 to deal with the waste throughput. The one or more containers units 150 placed on a surface and/or in stacked arrangement. The enclosure 500 provides supports 504 for the container units 150 and uses baffles or other flow control devices therein to direct cooling air around the stacked container units 150. The air may be blow into and/or blown around the enclosure by one or more fans 502. The front of the enclosure 500 can be opened to load and unload the container units 150 using fork lift trucks or the like.

Figure 6:
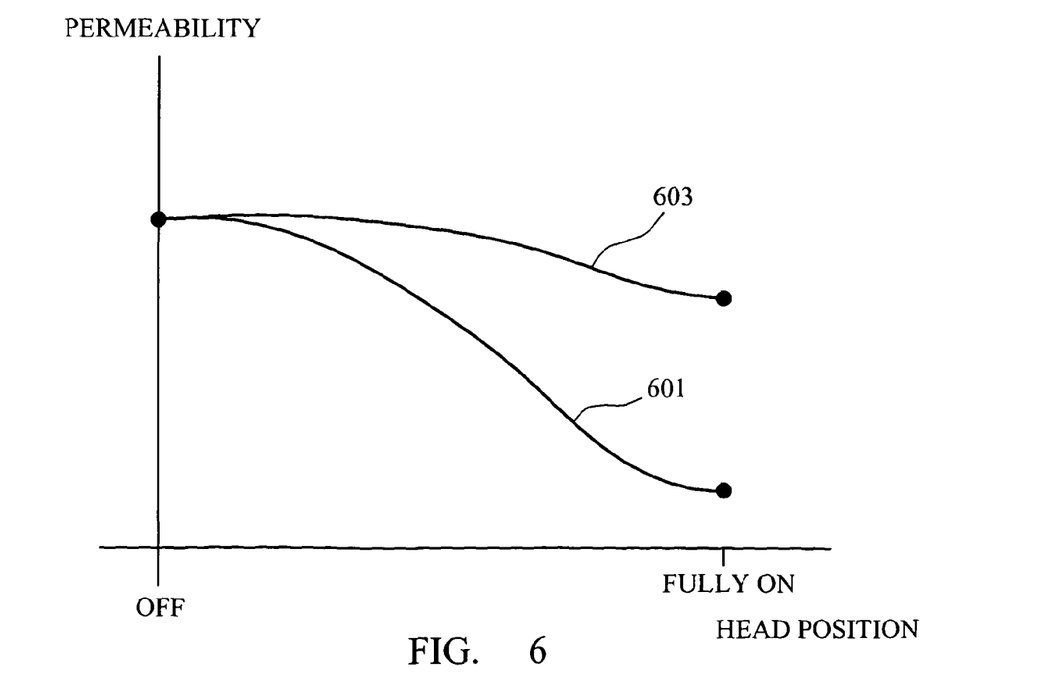
FIG. 6 schematically illustrates the variation in waste permeability with pressing.

The operation of the press head 200 and its effects on the waste 202 will now be described in more detail, with reference to FIG. 6 and FIG. 7 in particular.

With the container unit 150 in position within the press 100, the actuator 112 is used to drive down the press head 200 down. Hence this pushes the press head 200 into contact with the waste 202. Further downward movement displaces and compresses the waste 202 in the container unit 150. The compression serves to force air, and importantly oxygen, out of the waste 202 and hence removes the oxidant for the thermite reactions.

The downward motion continues until the press head 200 reaches its lowest position. In this lowest position, the press head 200 and in particular the press head peripheral portion 204 is in contact with the container unit 150, and in particular the container unit peripheral portion 206 thereof; FIG. 7. The container unit peripheral portion 206 and the press head peripheral portion 204 may be formed by opposing planar surfaces which closely abut one another in this position.

The compression of the waste 202 in reaching this lowest position forces oxygen from the waste 202. The seal formed between the container unit 150 and the dross press head 200 may be used to reduce or prevent further oxygen entering the waste 202 during pressing. This seal is removed, however, once the press head 200 is retracted.

The applicant has found, however, that the introduction of the press head 200 also has an important and beneficial effect upon the waste 202 itself.

The waste 202 is a relatively open and compressible material. Introduction of the press head 200 has a differential effect upon different parts of the depth of waste 202 within the container unit 150. Thus referring to FIG. 6, the variation in permeability as the press head 200 position advances from the off position to the fully on position is shown. Two different curves are shown, one an average in respect of the upper 5% of the depth of slag 202, curve 601; and the second an average in respect of the layer of slag which is between 25 and 30% up the height of the waste 202 when pressing starts, curve 603. The depth of waste 202 in question is that at the centre of the container unit 150 and/or at the mid point of a centre-line along the long axis of the container unit 150.

Before pressing starts, both sections of the waste 202 have equivalent and relatively high permeability.

As pressing continues, the permeability of the lower part of the waste 202 is reduced due to the level of compression occurring throughout the bulk of the waste 202. Thus there is a material reduction in permeability between the off and fully on positions for the press head 202.

The impact on the upper part of the waste 202, curve 601, is more pronounced. A variety of factors are believed to cause this effect.

Firstly, the force exerted by the press head 200 on the waste 202 is at its greatest in this section of the waste 202 as this is the part immediately contacted by the press head 200 and the compression force has not dissipated.

Secondly, the cooling effect on the waste 202 is greatest in this part as this part is closest to the press head 200 and the cooling it provides. This leads to rapid cooling of the waste 202 in this section. Upon cooling, the molten metal content within this section solidifies and forms a skin in this section of the waste 202. The skin further materially reduces the permeability of the waste 202 in that part of its depth. The gap between waste material is reduced by compression and a greater portion of the gaps are filled by solidified metal before it can move to other areas in the waste 202. Thus the skin is given a preferentially low permeability.

Figure 7:
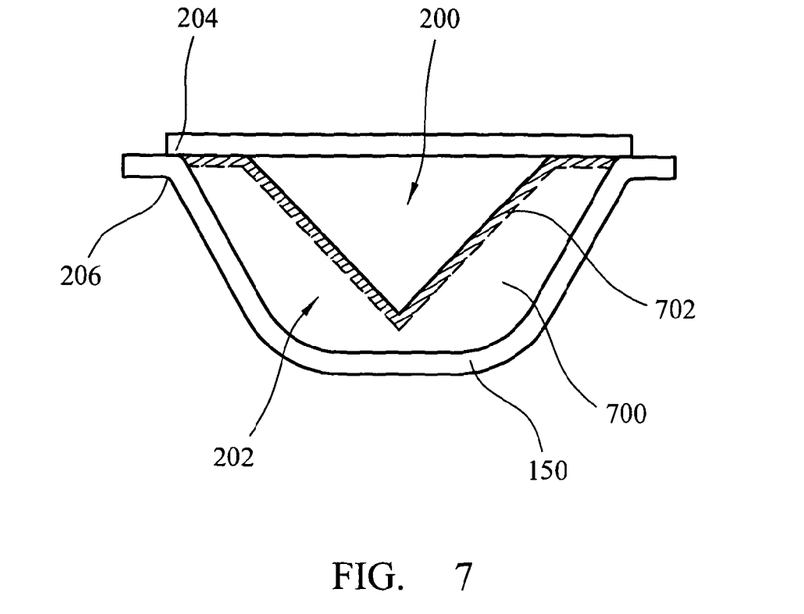
FIG. 7 schematically illustrates a cross-section through the width of a container unit and waste after pressing.

The overall effect is illustrated schematically in FIG. 7 for a cross section through the container unit 150. Thus the waste 700 which is distanced from the press head 200 is compressed, but retains a degree of permeability. However, the section of waste 702 adjacent to the press head 200 is compacted to a far greater degree and has its permeability also reduced by the solidification of the molten metal in that zone. Thus a skin 704 or barrier forms within this zone. Even when the press head 200 is removed, this skin 702 remains and so serves to isolate the waste 202 as a whole from oxygen. The smooth surface of the dross press head 200 assists in detaching the dross press head 200 from the skin 704 without damaging or disrupting that skin 704.

As a result of the isolation the skin 704 provides, the thermite reactions soon consume the remaining oxygen in the waste 202 and those reactions then quickly stop. Further heat is not generated as those heat generating reactions are not occurring and as a result the waste 202 can start to cool sooner. The ending of the thermite reaction at an early stage also means much of the aluminium still in the slag 202 remains as metal, rather than being oxidised. This makes it recoverable in subsequent operations, be they based on smelting, size reduction, chemical treatments or mixtures thereof.

Trials by the applicant have established that the compression causes the aluminium to cool and solidify as the press head 200 advances in the waste 202, rather than be pushed away from it. Hence, the preferential buildup of a higher metal content, lower permeability skin 704.

It is possible to provide one or more apertures in the container unit 150 to allow aluminium to drain from the container unit 150 during and/or after compression. The molten aluminium may be collected in a sow mould provided within the support structure below the container unit 150.

Once the press head 200 is no longer needed, the actuator 112 can then be used to withdraw the press head 200 upwards. The door 114 can then be opened. This gives space for the forklift truck to return, re-engage with container unit 150 and lift the container unit 150 out of the press 100. The press head 200 is retained in the press 100. A new container unit 150 can be immediately inserted into the press 100 in a repeat of the above process.

Once the waste 202 has cooled to the required degree within a container unit 150, the waste 202 may be extracted and reprocessed.

The container units 150 may be cleaned as necessary and returned to the loading position to receive more waste 202 in a repeat of the process. The cleaning may be beneficial in ensuring the seal functions correctly, for instance at the container unit peripheral portion 206, by ensuring no extraneous matter is present. Release agents may be applied to the receiving location and/or contact surface to assist in keeping them clean or easing their cleaning.

Figure 8:
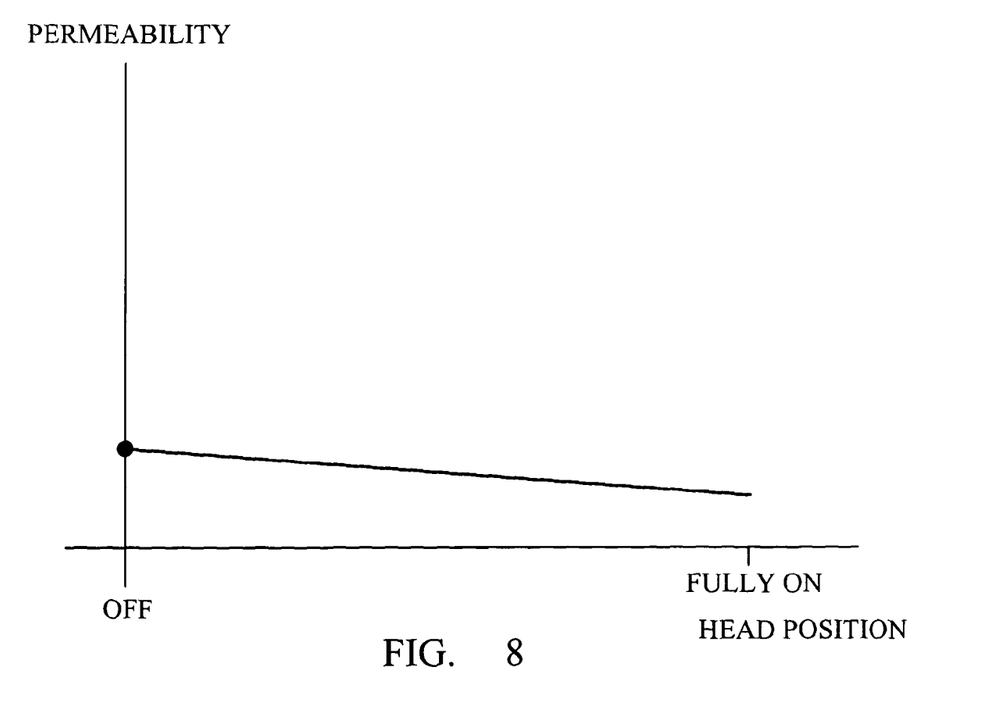
FIG. 8 schematically illustrates the variation in dross permeability with pressing.

The effect of the press head on the types of waste streams being processed is materially different from the effect on drosses, white drosses, which are currently pressed by dross presses. FIG. 8 shows the variation in permeability for a white dross with the introduction of a press head. The white dross, as previously mentioned, has a high metallic content. As a consequence, the white dross starts with a lower permeability than that seen in black drosses and the like, FIG. 6. The high metallic content and nature of the other material in the dross also mean that limited compaction is possible. Starting with few voids, there is little that can be forced out by the press head. Hence the variation in permeability from press head off to press head fully on is lower. There is still a reduction in permeability. Furthermore, the variation in permeability is consistent throughout the dross. Hence the signal curve shown in FIG. 7 is representative of the upper, middle and lower layers of the dross during compression. Again, this is believed to be a function of the metallic content, as this is high enough to fill the voids throughout the pressed dross and to convey the compressive forces throughout the pressed dross. Indeed, the result of white dross pressing is unitary mass of dross which can be lifted out of the container unit and carried laid across the forks of a forklift truck because of its low permeability and structural integrity which results. Indeed, the pressed white dross often has the appearance of a shiny metallic ingot and an appearance which is consistent for all parts thereof.

The invention claimed is:

1. A method of handling a molten metal processing by-product, the by-product having an aluminium content of less than 25% by weight and the by-product having a salt content of 10% to 75% by weight, the method including:
   providing a container unit;
   providing the by-product in the container unit;
   providing apparatus, the apparatus including an element having a first position outside of the container and a second position in which at least a part of the element is in the container;
   providing the container unit in the apparatus;
   moving the element from the first position to the second position;
   transferring heat from the by-product in the container unit to the element;
   compressing at least a part of the contents of the container unit;
   moving the element from the second position towards the first position;
   removing the container unit from the apparatus; and
   positioning the container unit at a cooling location;
   wherein moving the element from the first position to the second position and/or transferring heat from the by-product in the container unit to the element causes an oxygen impermeable and/or oxygen flow inhibiting layer to form on the by-product.

2. A method according to claim 1 wherein moving the element from the first position to the second position comprises one or more of:
   a) forcing oxygen out of the by-product and/or a receiving location prior to or as the oxygen impermeable and/or oxygen flow inhibiting layer forms on the by-product;
   b) reducing a permeability of one or more parts of the by-product;
   c) reducing a temperature of one or more parts of the by-product;
   d) reducing a volume occupied by the by-product.

3. A method according to claim 1 wherein moving the element from the first position to the second position causes a differential change in permeability between a first part of the by-product and a second part of the by-product, the differential change being that the permeability of each of the first and second parts of the by-product is reduced, but by different amounts.

4. A method according to claim 3 wherein the first part is proximal an upper surface of the by-product and the second part is distal the upper surface, the permeability of the first part being reduced more than the permeability of the second part.

5. A method according to claim 1 wherein moving the element from the first position to the second position and/or transferring heat from the by-product in the container unit causes a permeability change in a surface layer of the by-product and/or a portion of the by-product adjacent the element.

6. A method according to claim 1 in which a contact surface is provided on the container unit, the contact surface extending around an entire perimeter of a receiving location for the by-product.

7. A method according to claim 6 in which the contact surface is inclined, with a part which is nearer the receiving location being lower than a part which is further from the receiving location.

8. A method according to claim 6 wherein the element includes a first contact surface for contacting the by-product and a second contact surface for contacting the contact surface of the container unit, the second contact surface extending around an entire perimeter of the element.

9. A method according to claim 8 in which the second contact surface is inclined, with a part which is closer to a receiving location for the by-product being lower than a part which is further from the receiving location.

10. A method according to claim 8 wherein moving the element from the first position to the second position includes pushing the element towards the container unit until the contact surface on the container unit and the second contact surface on the element are in contact with one another.

11. A method according to claim 10 in which the contact surface of the element and the second contact surface restrict airflow into the receiving location.

12. A method according to claim 1 in which the method includes one or more of:
   a) moving the container unit from the apparatus to a storage location;
   b) stacking one or more container units on top of another apparatus at a storage location;
   c) providing one or more container units inside an enclosure at a storage location, the enclosure being passively cooled or actively cooled;
   d) actively cooling the container unit and/or by-product.

13. A method according to claim 1 in which the method provides one of:
   a) that moving the element from the first position to the second position causes a metal content of the by-product in the container unit to reduce by less than 10% by weight;
   b) that moving the element from the first position to the second position causes a metal content of the by-product, present as elemental aluminium, to be at least 80% by weight of that prior to moving the element from the first position to the second position;
   c) that moving the element from the first position to the second position causes a permeability of the by-product to be reduced to a level less than 85% of the permeability of the by-product prior to moving the element from the first position to the second position.

14. A method according to claim 1 in which the by-product is one of
   1) a waste stream from a rotary furnace;
   2) a black dross;
   3) a salt cake;
   4) a baghouse dust; or
   5) a slag.

15. A method according to claim 1 in which the by-product is one of
   1) a by-product having an aluminium content of less than 20% by weight;
   2) a by-product having an aluminium content of between 8% and 20% by weight;
   3) a by-product having a chloride and fluoride salt content of 10 to 75% by weight;
   4) a by-product having a chloride and fluoride salt content of between 15 and 45% by weight;
   5) a by-product having an aluminium content of less than 18% by weight;

6) a by-product having an aluminium content of between 12% and 18% by weight;
7) a by-product having a chloride and fluoride salt content of 12% to 50% by weight;
8) a by-product having an aluminium content of less than 18% by weight;
9) a by-product having an aluminium content of between 5 and 15% by weight; or
10) a by-product having a chloride and fluoride salt content of between 8 and 15% by weight.

16. A method for treating dross to enable recovery of aluminum, the dross having an aluminium content of less than 25% by weight and the dross having a salt content of 10% to 75% by weight, the method comprising:

placing the dross in a receiving location of a container unit, the container unit including a contact surface that extends around the receiving location;

inserting a press head into the receiving location to compress the dross, the press head including a first contact surface that compresses the dross and a second contact surface that forms a seal with the contact surface of the container unit, the seal inhibiting airflow into the receiving location;

maintaining the press head within the receiving location while the seal is formed on the dross and formed of the dross to cause a film to be formed on a surface of the dross that is in contact with the first contact surface, the film comprising a portion of the dross having a reduced permeability; and after the film is formed, removing the press head from the receiving location, the reduced permeability of the film inhibiting oxygen from permeating the dross after the press head has been removed.

17. The method of claim 16, wherein the first contact surface includes a coating to prevent the film from sticking to the first contact surface.

18. The method of claim 17, wherein the coating is boron nitride.

19. The method of claim 17, wherein the press head is wedge shaped.

20. The method of claim 16, wherein the press head includes an airflow inlet and an airflow outlet, the method further comprising:

circulating air through the press head, via the airflow inlet and airflow outlet, while the seal is formed.

21. A method of handling a molten metal processing by-product, the method including:

providing a container unit;
providing the by-product in the container unit;
providing apparatus, the apparatus including an element having a first position outside of the container unit and a second position in which at least a part of the element is in the container unit;
providing the container unit in the apparatus;
moving the element from the first position to the second position;
transferring heat from the by-product in the container unit to the element;
compressing at least a part of the contents of the container unit;
moving the element from the second position towards the first position;
removing the container unit from the apparatus; and
positioning the container unit at a cooling location;
wherein a transition from the first to the second position and/or transferring heat from the contents of the container unit to the element, causes an oxygen impermeable and/or oxygen flow inhibiting layer to form on the by-product, the oxygen impermeable and/or oxygen flow inhibiting layer being formed of the by-product.

* * * * *